OVEN.
APPLICATION FILED FEB. 21, 1907.

910,255.

Patented Jan. 19, 1909.

3 SHEETS—SHEET 1.

Witnesses:
Ira D. Perry
Robert H. Weir

Inventor:
Ernest Woollett
By Hiee & Hiee
Attys

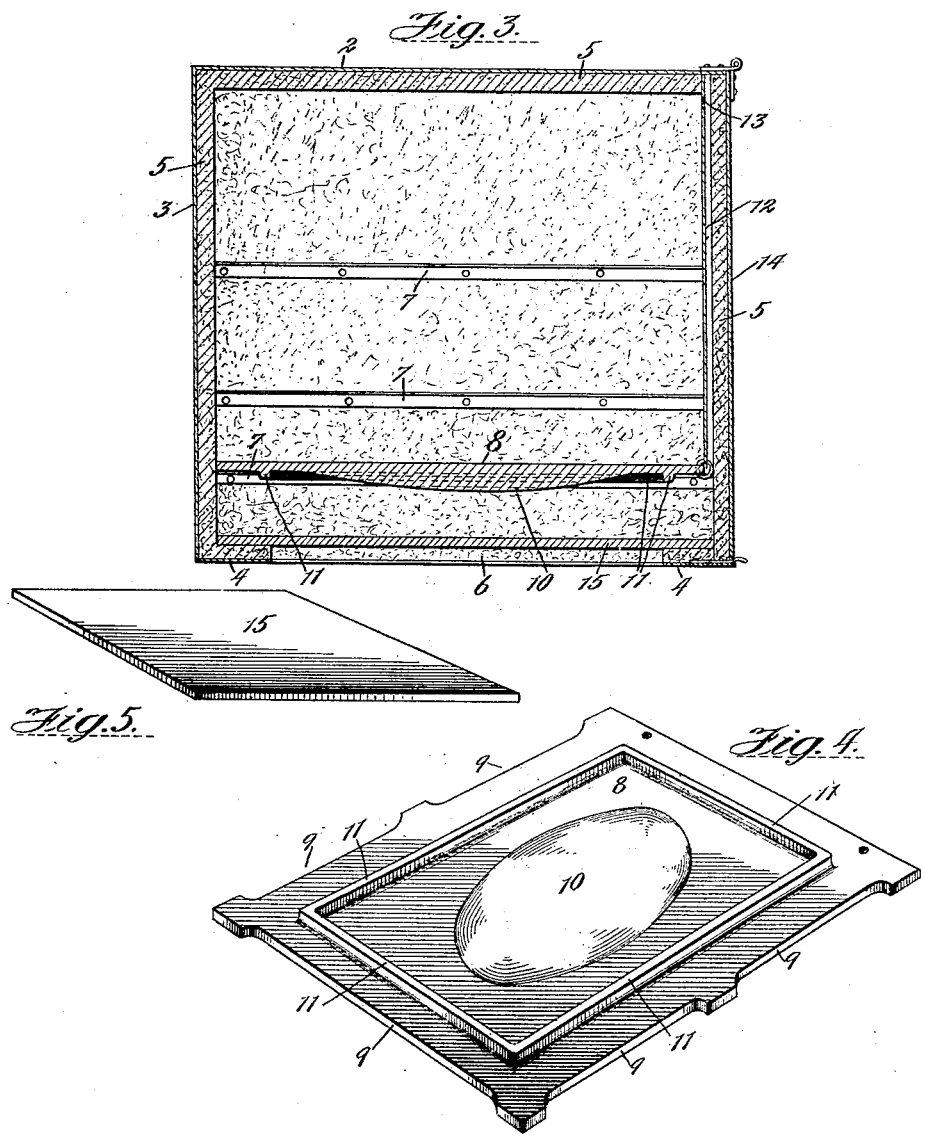

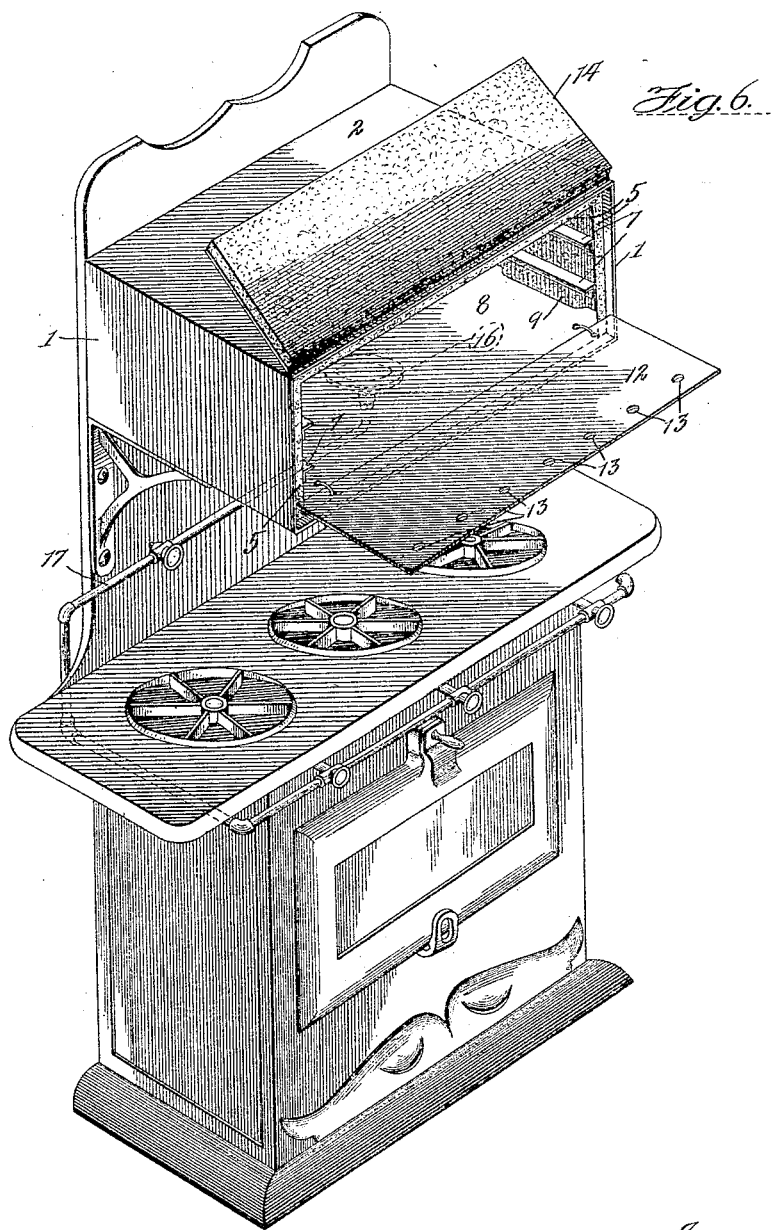

UNITED STATES PATENT OFFICE.

ERNEST WOOLLETT, OF CHICAGO, ILLINOIS, ASSIGNOR, BY MESNE ASSIGNMENTS, OF ONE-HALF TO E. F. DYRENFORTH, OF EVANSTON, ILLINOIS.

OVEN.

No. 910,255.     Specification of Letters Patent.     Patented Jan. 19, 1909.

Application filed February 21, 1907. Serial No. 358,720.

*To all whom it may concern:*

Be it known that I, ERNEST WOOLLETT, a citizen of the United States, residing at Chicago, in the county of Cook and State of Illinois, have invented certain new and useful Improvements in Ovens, of which the following is a description.

My invention relates particularly to the general class of ovens heated by gas or equivalent medium, and has for its object the construction of a simple, cheap and convenient device which will secure the desired result with the more economical use of the heating medium than is possible with the means usually employed.

To these ends it consists in the novel construction, arrangement and combination of parts herein shown and described and more particularly pointed out in the claims.

Figure 1:
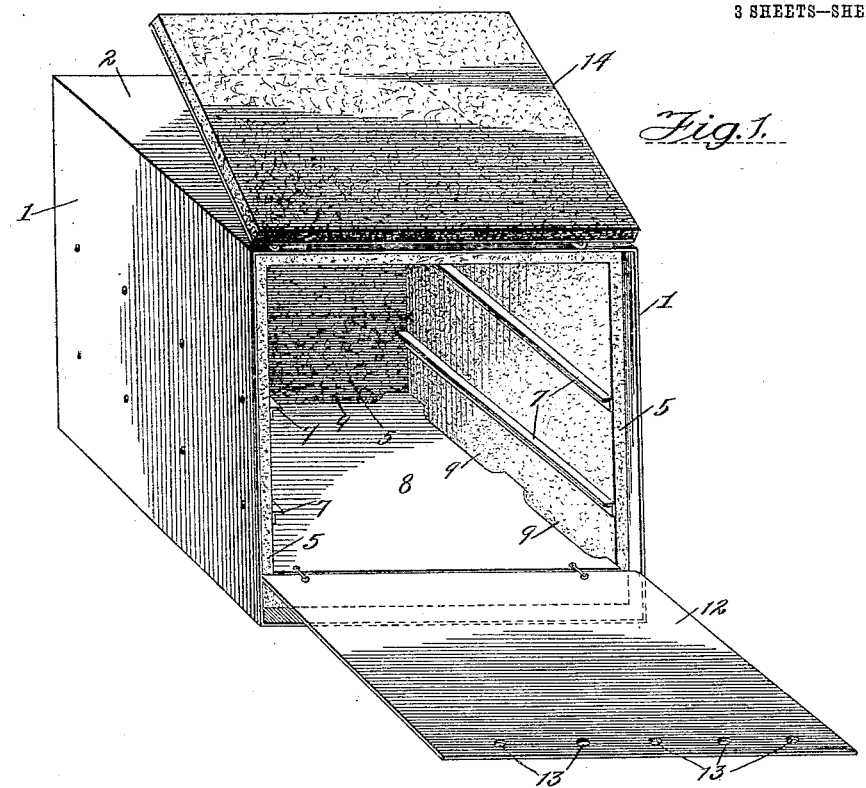
Figure 2:
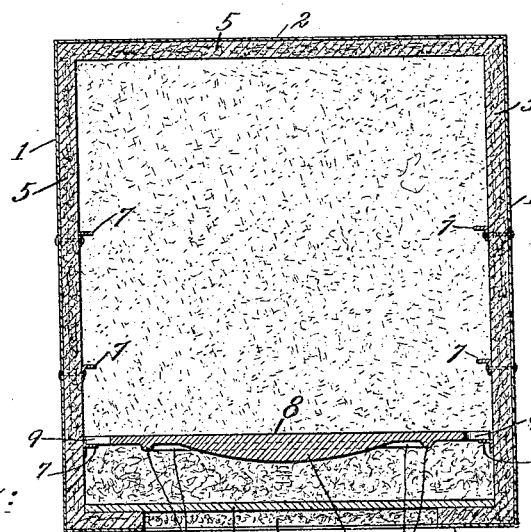

In the drawings wherein like reference characters indicate like or corresponding parts, Figure 1 is a perspective view of my improved device opened to show the construction; Fig. 2 is a central transverse section of the same; Fig. 3 is a central longitudinal section showing the doors closed; Fig. 4 is a perspective view of the bottom of the heat storing plate; Fig. 5 is a perspective view of the removable plate employed to close the side of the oven through which the heat is admitted, and Fig. 6 is a perspective view showing my invention embodied in an oven permanently secured to or forming a part of a gas stove.

In the preferred form shown in the drawings, 1—1 are the side walls, 2 the top, 3 the rear wall and 4 the bottom of a portable gas oven. The various walls are particularly constructed to retain the heat admitted and, as far as possible, prevent the escape of heat by radiation. As shown in the drawings, the exterior of the oven is of metal, while the interior portion of the walls 5 is composed of any suitable material for the purpose such, for example, as asbestos, or some suitable form of cement or equivalent material for the purpose of retaining the heat and preventing the escape by radiation. The bottom of the oven is provided with a central opening 6, through which the flame and heat may enter when the oven is placed over a suitable burner. The oven is provided with a number of ways 7—7 for supporting the usual grates or plates. The lower pair of ways is employed for the purpose of supporting a heat storing plate 8 of peculiar construction. The plate 8 is preferably removable and is cut away at the sides and rear end as at 9 to permit the heat to pass by the plate and into the oven. Near the center of the plate it is preferably thickened as at 10 to provide a greater body for storing the heat. In the preferred construction a bead 11 encircles the thickened portion 10 for strengthening the plate and to prevent its warping. At the front end of the plate in the preferred form, a door or extension 12 is suitably hinged and is so formed that when the plate is in position, as shown in Fig. 1, the door may close against the end of the oven substantially closing it to retain the heat passing into the oven by the plate. Suitable means are employed to permit the heat to partially escape near the top of the door to secure circulation. This is accomplished in the form shown by suitable apertures 13. A door 14 of the same general construction as the sides and top of the oven is preferably hinged at the top, as shown, and is adapted to be shut down snugly outside the door 12 to close the end of the oven. A plate 15 of non-conducting material is provided to be positioned beneath the plate 8 to close the aperture 6, and thus prevent the escape of heat in that way.

The mode of operation is as follows: The oven being in the position shown in Fig. 1, with a suitable grate or plate upon the ways 7, the food to be cooked is placed in position and the door 12 closed. The oven is then placed over a suitable burner in such a manner that the heat is directed upon the part 10 of the storage plate 8, the excess heat passing around the margins of the plate into the interior of the oven and partially escaping through the apertures 13. By this means the process of cooking is primarily begun while at the same time the storage plate 8 is becoming thoroughly heated. After a suitable length of time, depending upon the form and construction of the storage plate, and the nature of the article to be cooked, the flame is extinguished, the plate 15 is placed in position closing the aperture 6 in the bottom of the oven, as shown in Figs. 2 and 3, and the door 14 is closed, as shown in Fig. 3. By this means the bottom of the oven becomes also a heat retaining wall and the heat stored in the plate 8 tends to maintain the temperature in the snugly closed oven for an indefinite length of time. In practice with ovens constructed substantially as shown, I have found that in permitting the primary heating operation to extend over a period of fifteen minutes, and then closing the oven as described, the cooking operation will be actively continued for about two hours, greatly economizing the process and improving the quality of the food cooked. If the food be of a nature that requires more cooking, it is only necessary to repeat the operation described.

The form of the storage plate may be modified as desired to secure the best results. In practice I have found that in placing the thickened portion of the plate at the central point where the heat, and perhaps the flame, impinge upon it improved results are secured. To secure this result and at the same time reduce the weight of the plate to a minimum I prefer to construct the plate substantially as shown in the drawings, in which the lower face 10 is gradually increased to its greatest thickness at the central point. This form of plate retains the heat in a satisfactory manner without unnecessarily increasing the weight of the plate.

In the form shown in Fig. 6, the removable plate 15 may be dispensed with, the burner 16 shown in dotted lines being permanently positioned beneath the removable storage plate 8. When the door 12 is closed and the door 14 shut down the entire oven will be closed to prevent the escape of heat. In the form shown in Fig. 6 the bottom of the oven as well as the other walls is preferably of a heat retaining nature, the pipe 17 supplying the burner 16 passing through the wall with a suitable fitting to prevent the escape of heat.

Having thus described my invention, what I claim as new and desire to secure by Letters Patent is:—

1. An oven provided with insulated walls to retain the heat therein, and also having an opening for admission of heat to its interior, a heat-storing plate arranged within said oven in proximity to the opening thereof to directly receive the heat passing into the oven, and means for closing said opening to prevent the escape of the heat therefrom.

2. An oven provided with insulated walls to retain the heat therein, and also having an opening for the admission of heat to its interior, a heat storing plate arranged within said oven in proximity to the opening thereof to directly receive the heat passing into the oven, and a plate for closing said opening to prevent the escape of heat therefrom.

3. An oven provided with insulated walls to retain the heat therein, and also having an opening for the admission of heat to its interior, a heat-storing plate arranged within said oven in proximity to the opening thereof to directly receive the heat passing into the oven, and a substantially non-conducting removable plate for closing said opening to prevent the escape of the heat therefrom.

4. An oven provided with insulated walls to retain the heat therein, and also having an opening for the admission of heat to its interior, a heat-storing plate arranged within said oven in proximity to the opening thereof to directly receive the heat passing into the oven, said plate having its body thickened to increase its storage capacity for the heat, and means for closing said opening to prevent the escape of the heat therefrom.

5. An oven provided with insulated walls to retain the heat therein, and also having an opening for the admission of heat to its interior, a heat-storing plate arranged within said oven in proximity to the opening thereof to directly receive the heat passing into the oven, said plate having its edges constructed to permit the surplus heat to pass around the same, and means for closing said opening to prevent the escape of the heat therefrom.

6. An oven provided with insulated walls to retain the heat therein, and also having an opening for the admission of heat to its interior, a heat-storing plate arranged within said oven in proximity to the opening thereof to directly receive the heat passing into the oven, said plate having its body thickened to increase its storage capacity for the heat, and also having its edges constructed to permit the surplus heat to pass around the same, and means for closing said opening to prevent the escape of the heat therefrom.

7. A device of the kind described, comprising an oven provided with a heat receiving side, heat retaining walls to complete the inclosure, one of the walls being provided with a door, in combination with a heat storage plate arranged in proximity to the heat receiving side and provided at one end with an extension forming a door adapted to partially close the open side of the oven, and a removable plate constructed to lie in proximity to said heat receiving side to form a heat retaining wall to retard the radiation of the stored heat.

8. A device of the kind described, comprising an oven provided with a heat receiving side partially open to admit the heating medium, and heat retaining walls to complete the inclosure, one of said walls provided with a door, in combination with a removable heat retaining plate adapted to be heated by the heating medium, and constructed to permit the surplus heat to pass around the margins of the plate, and provided with an extension adapted to partially close the open side of the oven, and a removable plate constructed to lie in proximity to said heat receiving side to form a heat retaining wall to retard the radiation of the stored heat from the oven.

9. A heat-storing plate, comprising a plate adapted to be placed within an oven in the direct path of the heating medium, said oven having an open side, said plate having its central portion thickened to increase its heat-storing capacity, with an extension connected to the plate and adapted to partially close the open side of the oven during the primary process of heating the same.

In testimony whereof, I have hereunto signed my name in the presence of two subscribing witnesses.

ERNEST WOOLLETT.

Witnesses:
   Roy W. Hill,
   Charles I. Cobb.